US012076661B2

(12) United States Patent
Trainoff et al.

(10) Patent No.: US 12,076,661 B2
(45) Date of Patent: Sep. 3, 2024

(54) MANAGING SOLVENT ASSOCIATED WITH A FIELD FLOW FRACTIONATOR (71) Applicant: Wyatt Technology, LLC, Goleta, CA (US)

(72) Inventors: Steven P. Trainoff, Santa Barbara, CA (US); David Rahmlow, Goleta, CA (US)

(73) Assignee: Wyatt Technology LLC, Goleta, CA (US)

( * ) Notice: Subject to any disclaimer, the term of this patent is extended or adjusted under 35 U.S.C. 154(b) by 337 days.

(21) Appl. No.: 17/502,007

(22) Filed: Oct. 14, 2021

(65) Prior Publication Data

US 2022/0212123 A1    Jul. 7, 2022

Related U.S. Application Data (60) Provisional application No. 63/091,879, filed on Oct. 14, 2020.

(51) Int. Cl.
*B01D 15/18* (2006.01)
*B01D 15/14* (2006.01)
*B01D 15/16* (2006.01)
*G01N 30/00* (2006.01)
(Continued)

(52) U.S. Cl.
CPC .......... *B01D 15/163* (2013.01); *B01D 15/14* (2013.01); *G01N 30/38* (2013.01); *G05D 7/0635* (2013.01); *G01N 2030/0025* (2013.01)

(58) Field of Classification Search
CPC ...... B01D 15/163; B01D 15/14; B01D 15/08; B01D 15/10; B01D 15/18; B01D 15/1814; G05D 7/0635; G01N 30/0005; G01N 30/0025; G01N 30/003; G01N 30/38; G01N 30/44; G01N 1/10; G01N 1/34; G01N 2030/0025; G01N 2030/003;
(Continued)

(56) References Cited

U.S. PATENT DOCUMENTS 3,449,938 A * 6/1969 Giddings ........... G01N 30/0005
73/23.39
4,992,168 A   2/1991 Takayama et al.
(Continued)

FOREIGN PATENT DOCUMENTS

CN   107076709 A * 8/2017 ............... C12Q 1/68
CN   110261520 A * 9/2019 ............. G01N 30/06
(Continued)

OTHER PUBLICATIONS

Translation of Chen et al Patent Publication CN110261520A, published Sep. 20, 2019. (Year: 2019).*
(Continued)

*Primary Examiner* — Joseph W Drodge
(74) *Attorney, Agent, or Firm* — Leonard Guzman (57) ABSTRACT The present disclosure describes an apparatus of managing solvent associated with a field flow fractionator. In an exemplary embodiment, the apparatus includes (1) a union assembly coupled to a detector flow output from at least one detector coupled to a field flow fractionator, and (2) a recycle and waste assembly coupled to an output of the union assembly and a channel cross flow output of the field flow fractionator.

20 Claims, 6 Drawing Sheets (51) Int. Cl.
*G01N 30/38* (2006.01)
*G05D 7/06* (2006.01)

(58) Field of Classification Search
CPC ......... B01L 2200/06; B01L 2200/0631; B01L 2400/0602
See application file for complete search history.

(56) References Cited

U.S. PATENT DOCUMENTS

| | | | | |
|---|---|---|---|---|
| 5,160,625 | A * | 11/1992 | Jonsson | G01N 30/0005 210/659 |
| 6,365,050 | B1 * | 4/2002 | Cauchon | G01N 30/0005 210/800 |
| 6,541,272 | B1 * | 4/2003 | Mitra | G01N 1/34 73/23.35 |
| 8,585,884 | B2 | 11/2013 | Moon et al. | |
| 9,897,577 | B2 | 2/2018 | Klein | |
| 10,132,782 | B2 | 11/2018 | Welz et al. | |
| 2013/0319945 | A1 | 12/2013 | Rosch et al. | |
| 2016/0011155 | A1 * | 1/2016 | Klein | G01N 30/0005 73/61.56 |
| 2016/0238571 | A1 | 8/2016 | Welz et al. | |
| 2019/0017855 | A1 | 1/2019 | Sawada et al. | |
| 2019/0317057 | A1 | 10/2019 | Oikawa et al. | |
| 2020/0249208 | A1 * | 8/2020 | Oikawa | G01N 30/0005 |
| 2021/0372972 | A1 * | 12/2021 | Oikawa | G01N 30/0005 |

FOREIGN PATENT DOCUMENTS

| | | | | |
|---|---|---|---|---|
| CN | 210465358 U | * | 5/2020 | ............. G01N 30/06 |
| WO | WO-2012038518 A2 | * | 3/2012 | ............. B01D 63/02 |

OTHER PUBLICATIONS

Translation of Chen et al Patent Publication CN210465358, published May 5, 2020. (Year: 2020).*
English Translation of Johann C. Patent Publication WO 2012038518, published Mar. 2012. (Year: 2012).*
English Translation of Ashby J. Patent Publication CN 107076709, published Aug. 2017. (Year: 2017).*
International Search Report and Written Opinion in PCT/US2022/046793 mailed on Jan. 31, 2023.
International Preliminary Report on Patentability in PCT/US2022/046793 mailed on Apr. 25, 2024.

* cited by examiner

MANAGING SOLVENT ASSOCIATED WITH A FIELD FLOW FRACTIONATOR

PRIORITY

This application claims priority to U.S. Provisional Patent Application No. 63/091,879, filed Oct. 14, 2020.

BACKGROUND

The present disclosure relates to field flow fractionators, and more specifically, to managing solvent associated with a field flow fractionator.

SUMMARY

The present disclosure describes an apparatus of managing solvent associated with a field flow fractionator. In an exemplary embodiment, the apparatus includes (1) a union assembly coupled to a detector flow output from at least one detector coupled to a field flow fractionator, and (2) a recycle and waste assembly coupled to an output of the union assembly and a channel cross flow output of the field flow fractionator.

DETAILED DESCRIPTION

The present disclosure describes an apparatus of managing solvent associated with a field flow fractionator. In an exemplary embodiment, the apparatus includes (1) a union assembly coupled to a detector flow output from at least one detector coupled to a field flow fractionator, and (2) a recycle and waste assembly coupled to an output of the union assembly and a channel cross flow output of the field flow fractionator.

Figure 1:
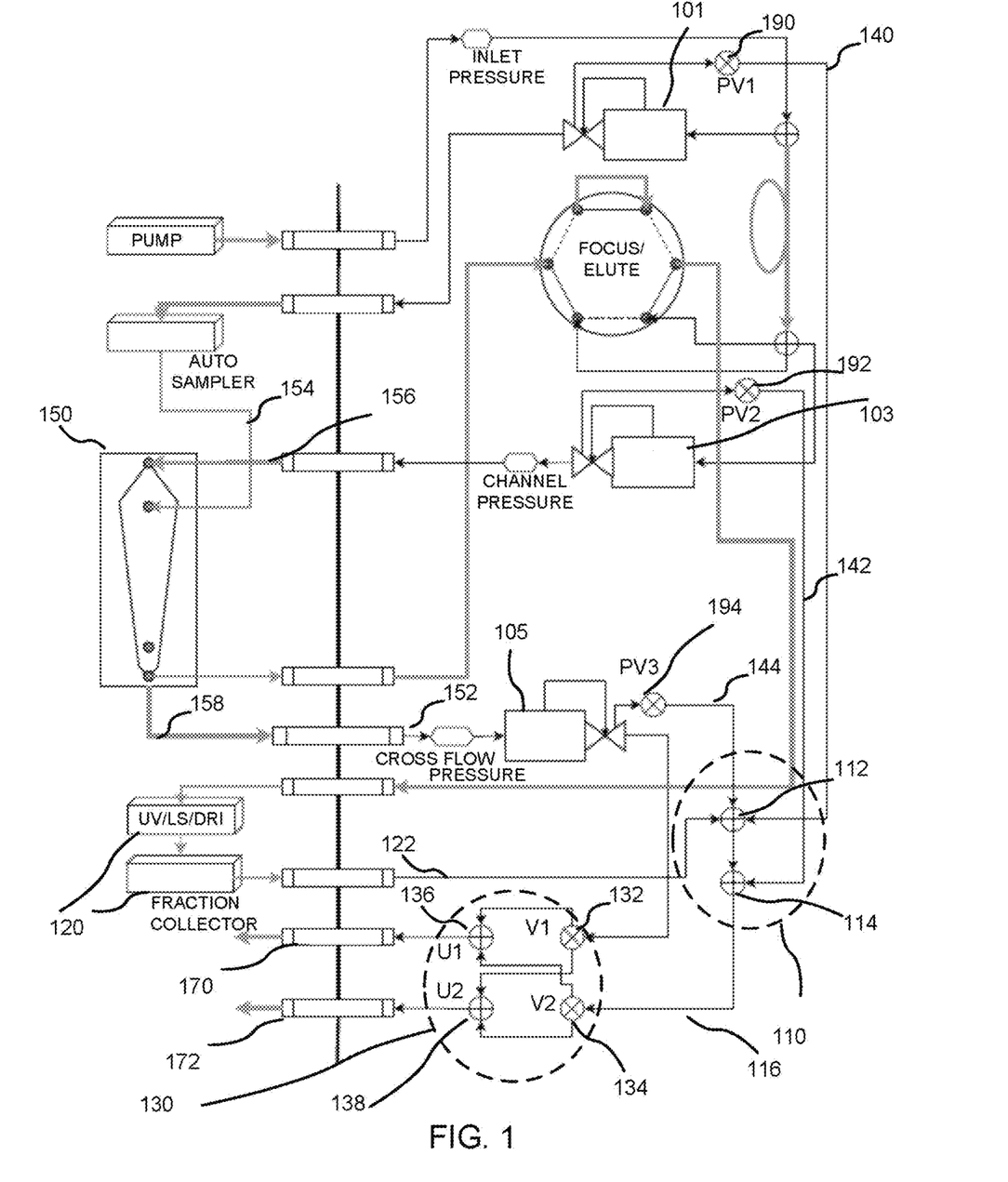
FIG. 1 depicts an apparatus in accordance with an exemplary embodiment.
Figure 2:
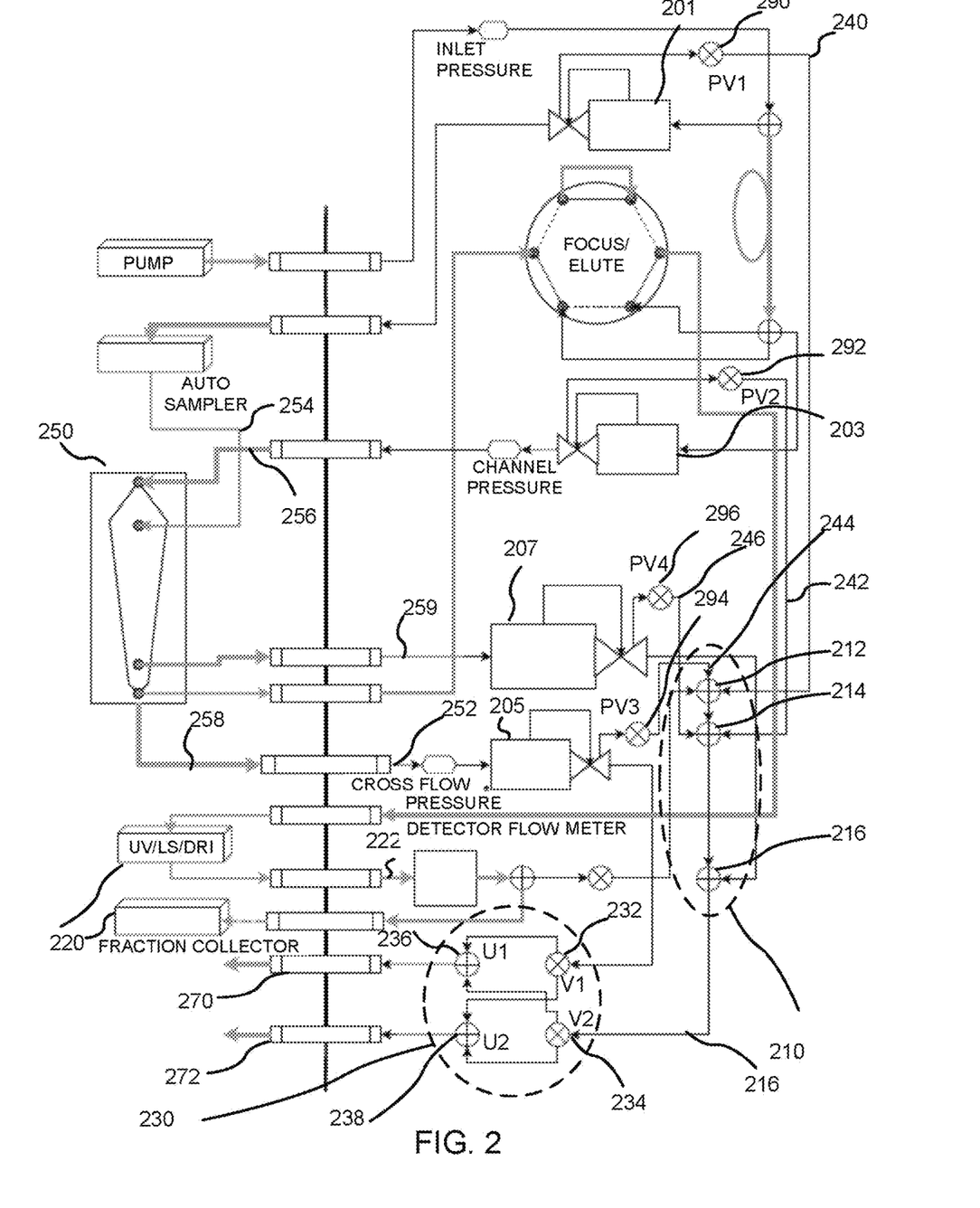
FIG. 2 depicts an apparatus in accordance with an exemplary embodiment.

In an embodiment, FIG. 1, FIG. 2, FIG. 4, and FIG. 5 show the plumbing associated with an AF4 system. Most of the control elements are associated with controlling the FFF process, but the valves and unions highlighted by the red boxes are the ISM system. Valves V1 and V2 control the routing of the cross flow and detector flow waste/recycle. Also shown in blue are a series of two-way valves that are connected to the bleed ports of each of the control valves. They are routed together with the detector flow with a four-port union in the upper right red box and are sent to waste or recycle More advanced FFF apparatus may include additional fluid flows, as depicted in FIG. 2. For example, the introduction of the Dilution Control Module (DCM) adds an additional waste stream. During normal operation, this stream is always expected to be uncontaminated. However, it is possible that sample could, become flushed down this path. To simplify system plumbing, we choose to combine the DCM waste stream with the detector stream rather than provide a separate control; both are switched together. The DCM stream could also have been separately filtered, but this would add extra maintenance burdens.

The present disclosure describes an intelligent solvent management system that can automatically route solvent flows from the detector port, cross flow port, and control valve bleed ports to either recycle or waste on a per-method basis. The solvent usage and number of injections are tracked to prevent the system from running out of solvent and to alert the user that membrane should be replaced.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Field Flow Fractionation

The separation of particles in a solution by means of field flow fractionation, FFF, was studied and developed extensively by J. C. Giddings beginning in the early 1960s. The basis of these techniques lies in the interaction of a channel-constrained sample and an impressed field applied perpendicular to the direction of flow. Among those techniques of current interest is cross flow FFF, often called symmetric flow (SFlFFF), where an impressed field is achieved by introducing a secondary flow perpendicular to the sample borne fluid within the channel. There are several variations of this technique including asymmetric flow FFF (i.e., A4F), and hollow fiber (H4F) flow separation.

Other FFF techniques include (i) sedimentation FFF (SdFFF), where a gravitational/centrifugal cross force is applied perpendicular to the direction of the channel flow, (ii) electrical FFF (EFFF), where an electric field is applied perpendicular to the channel flow, and (ii) thermal FFF (ThFFF), where a temperature gradient is transversely applied.

Common to all these methods of field flow fractionation is a fluid, or mobile phase, into which is injected an aliquot of a sample whose separation into its constituent fractions is achieved by the application of a cross field. Many of the field flow fractionators allow for the control and variation of the strength of the cross field during the time the sample aliquot flows down the channel, be it electrical field, cross flow, thermal gradient, or other variable field.

Symmetric Flow Cross Flow Fractionator (SFlFFF)

As an illustration of the separation of particles by field flow fractionation, a simplification of perhaps the most straightforward system, a SFlFFF, is described. A sample is injected into an inlet port along with the spending mobile phase. The sample is allowed to undergo a so-called "relaxation phase," where there is no applied channel flow, but larger particles are forced further down the height of the channel than smaller particles by the constantly applied cross flow. Once the channel flow is resumed, the sample aliquot begins to undergo non-steric separation while it moves down the length channel with the smaller particles leading the larger ones, as they inhabit a region of the cross section of the channel flow nearer the center of the height of the channel where the channel flow is most swift. By increasing the cross flow rate, the separation of all species continues while the larger fractions begin to trail further behind their smaller sized companions. After exiting the channel through the outlet port the fractionated sample may be analyzed using various detectors.

Asymmetric Flow FFF (A4F)

An asymmetric flow FFF (A4F) is generally considered a variation of the earlier developed SFlFFF. An A4F channel assembly may include (1) a bottom assembly structure holding a liquid-permeable frit surrounded by a sealing O-ring, (2) a permeable membrane that lies on the frit, (3) a spacer of thickness from about 75 µm to 800 µm into which has been cut a cavity, and (4) a top assembly structure generally holding a transparent plate of polycarbonate material or glass.

The resulting sandwich is held together with bolts or other means, such as applied pressure adequate to keep the channel sealed against leaks, where such pressure may be applied by vise or clamping mechanism so long as it is able to provide relatively even pressure across the channel assembly such that no leaks occur. The generally coffin-shaped or tapered cavity in the spacer serves as the channel in which separation will occur. The top assembly structure usually contains three holes, called ports, that pass through the top plate and are centered above the channel permitting the attachment of fittings thereto. These ports are (a) a mobile phase inlet port located near the beginning of the channel and through which is pumped the carrier liquid, the so-called mobile phase, (b) a sample port, downstream of the inlet port, into which an aliquot of the sample to be separated is introduced to the channel and focused thereunder, and (c) an exit port through which the fractionated aliquot leaves the channel near the end of the cavity.

Asymmetric Flow Field Flow Fractionation (AF4) systems are used to fractionate molecules and particles by the well-known Flow FFF principle. There are a number of variations of the AF4 systems that vary in the way the sample is introduced and extracted from the channel, but in general they always have at least three ports. There is an inlet port that brings fluid into the channel, a detector output port that contains the fractionated fluid stream and a cross flow output port that contains the fluid that has passed through the semipermeable membrane that forms the accumulation wall. There can be extra ports such as and injection inlet to introduce the sample near the inlet or an extra split output port to strip off the sample free carrier solvent near the detector port, but at its simplest there must always be at least three. Additionally, many of the internal components such as control valves or pressure transducers may also have bleed ports that need to be periodically flushed to eliminate bubbles or stagnant solvent.

Current Technologies

The simplest way to operate a FFF channel is to cross flow solvent to waste and to send the flow out the detector port to the analysis instruments and then also to waste. When flushing the channel or after the sample has fully eluted both the cross flow and detector flows are essentially clean solvent, so there is the opportunity of recycling these flows back into the solvent reservoir and thereby reduce the volume of solvent required for an analysis.

Thus, there is a need to manage solvent associated with a field flow fractionator via an intelligent solvent management system that can route the exit fluid flows to either waste or recycle depending on the experiment that is performed.

Referring to FIG. 1 and FIG. 2 in an exemplary embodiment, the apparatus includes a union assembly 110, 210 coupled to a detector flow output 122, 222 from at least one detector 120, 220 coupled to a field flow fractionator 150, 250, and (2) a recycle and waste assembly 130, 230 coupled to an output 116, 218 of union assembly 110, 210 and a channel cross flow output 152, 252 of field flow fractionator 150, 250.

Union Assembly

In an embodiment, as depicted in FIG. 1, union assembly 110 is coupled to at least one purge flow output 140, 142, 144 coupled to field flow fractionator 150. In an embodiment, union assembly 110 includes a five port union 110 coupled to three purge flow outputs 140, 142, 144 coupled to field flow fractionator 150 and detector flow output 122. In an embodiment, as depicted in FIG. 1A and FIG. 1B, union assembly 110 includes a plurality of unions 112, 114 coupled to three purge flow outputs 140, 142, 144 coupled to field flow fractionator and the detector flow output 150.

In an embodiment, as depicted in FIG. 1, union assembly 110 includes (a) a four port union 112 coupled to two purge flow outputs 140, 142 coupled to field flow fractionator 150 and detector flow output 122, and (b) a three port union 114 coupled to a third purge flow output 144 coupled to field flow fractionator 150 and an output port of four port union 112.

Dilution Control Module

In an embodiment, as depicted in FIG. 2, union assembly 210 includes a seven port union 210 coupled to four purge flow outputs 240, 242, 244, 246 coupled to field flow fractionator 250, a dilution control module (DCM) waste flow output 260 coupled to field flow fractionator 250, and detector flow output 222. In an embodiment, as depicted in FIG. 2A and FIG. 2B, union assembly 210 includes a plurality of unions 212, 214, 216 coupled to four purge flow outputs 240, 242, 244, 246 coupled to field flow fractionator 250, dilution control module waste flow output 260 coupled to field flow fractionator 250, and detector flow output 222. In an embodiment, union assembly 210 is coupled to detector flow output 222.

In an embodiment, union assembly 210 includes (a) a first four port union 212 coupled to two purge flow outputs 240, 244 coupled to field flow fractionator 250 and detector flow output 222, (b) a second four port union 214 coupled to an output 213 of first four port union 212 and two purge flow outputs 242, 246 coupled to field flow fractionator 250, and (c) a three port union 216 coupled to an output port 215 of second four port union 214 and DCM waste flow output 260 coupled to field flow fractionator 250. In an embodiment, two purge flow outputs 240, 244 coupled to first four port union 212 include a cross flow controller purge flow output 244 and an inject flow controller purge flow output 240. In an embodiment, two purge flow outputs 240, 244 coupled to first four port union 212 are cross flow controller purge flow output 244 and inject flow controller purge flow output 240.

In an embodiment, two purge flow outputs 242, 246 coupled to second four port union 214 include a dilution control module pressure controller purge flow output 246 and an inlet flow controller purge flow output 242. In an embodiment, two purge flow outputs 242, 246 coupled to second four port union 214 are dilution control module pressure controller purge flow output 246 and inlet flow controller purge flow output 242.

Manifold

Figure 3A:
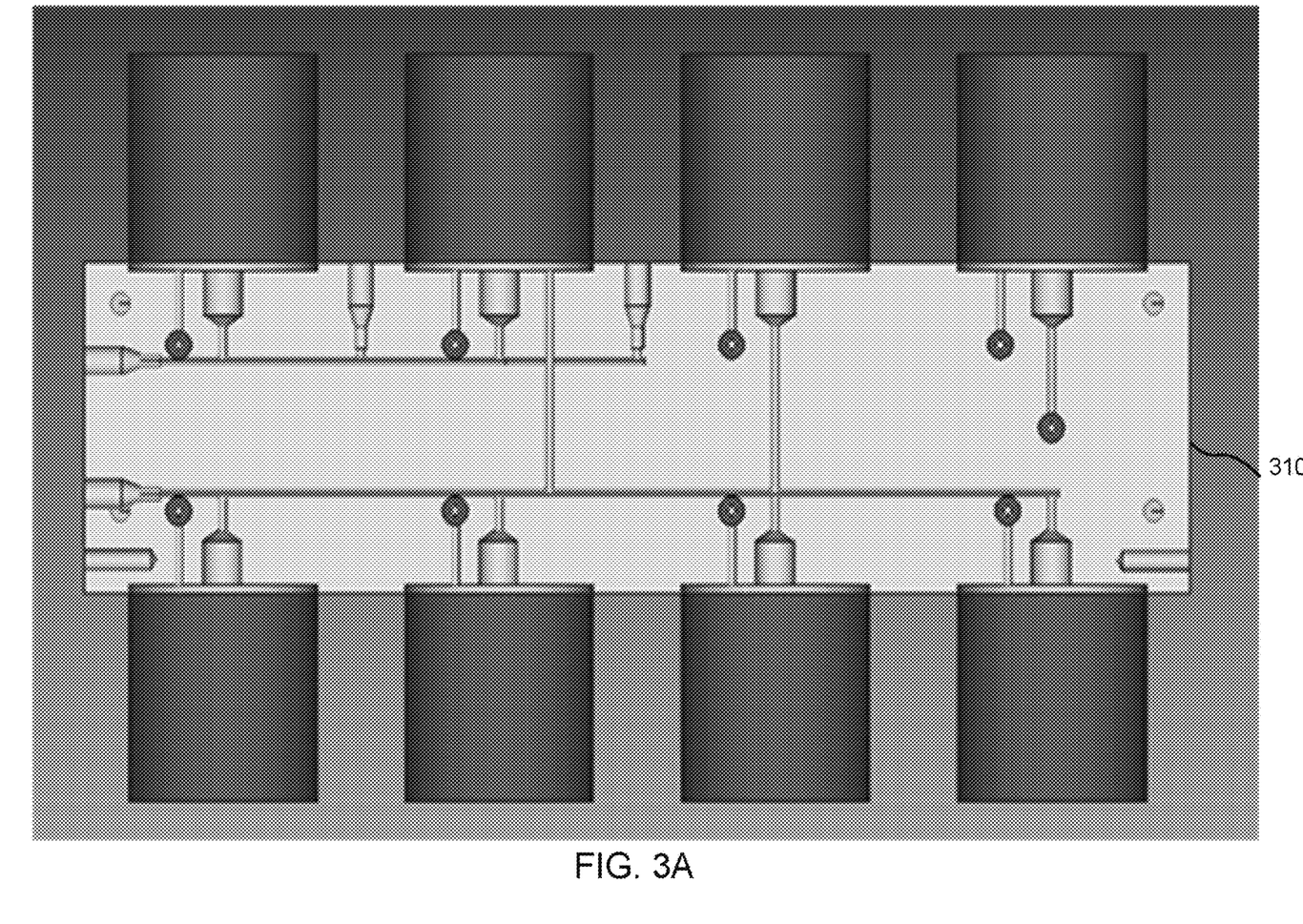
FIG. 3A depicts an apparatus in accordance with an exemplary embodiment.
Figure 3B:
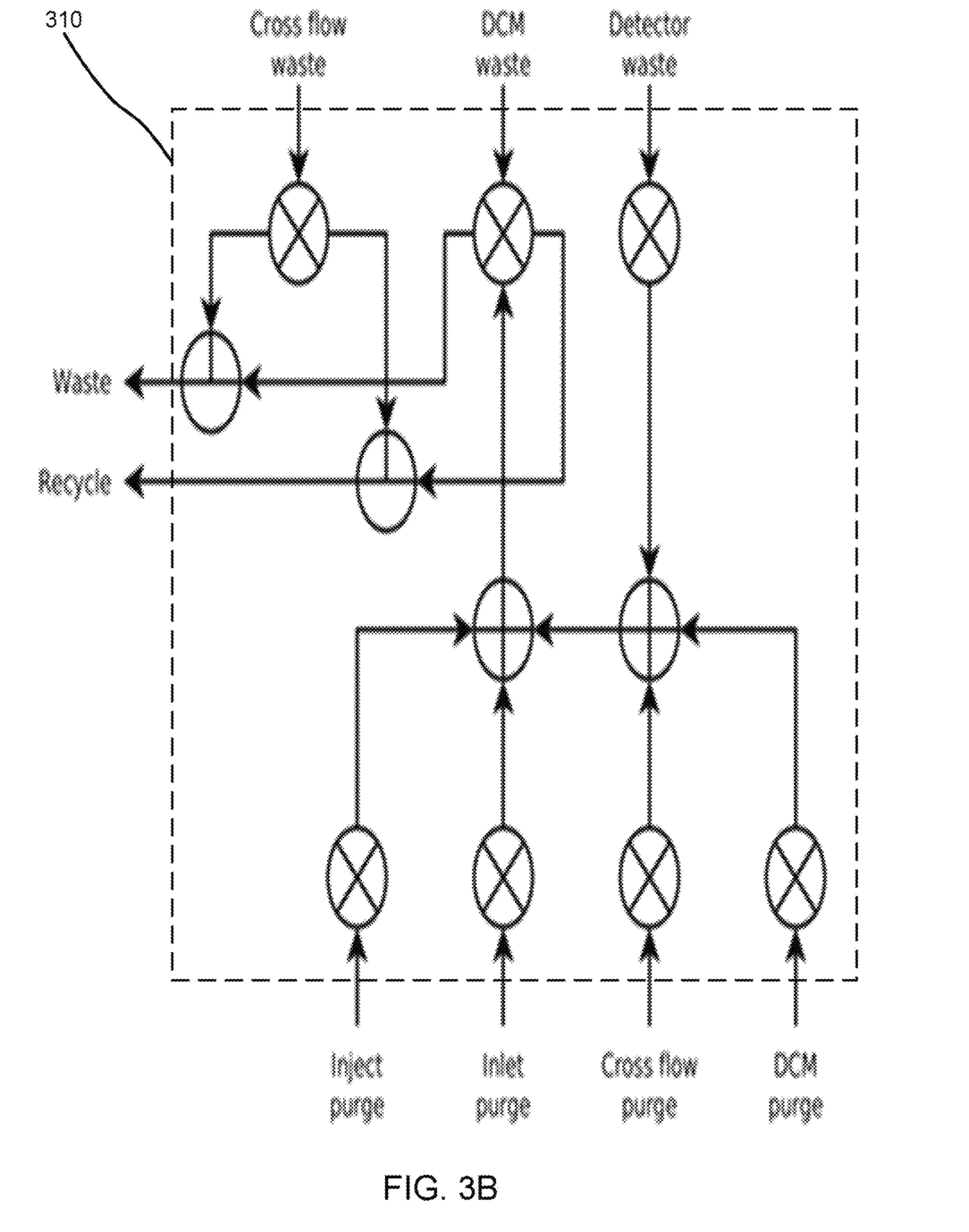
FIG. 3B depicts an apparatus in accordance with an exemplary embodiment.
Figure 4:
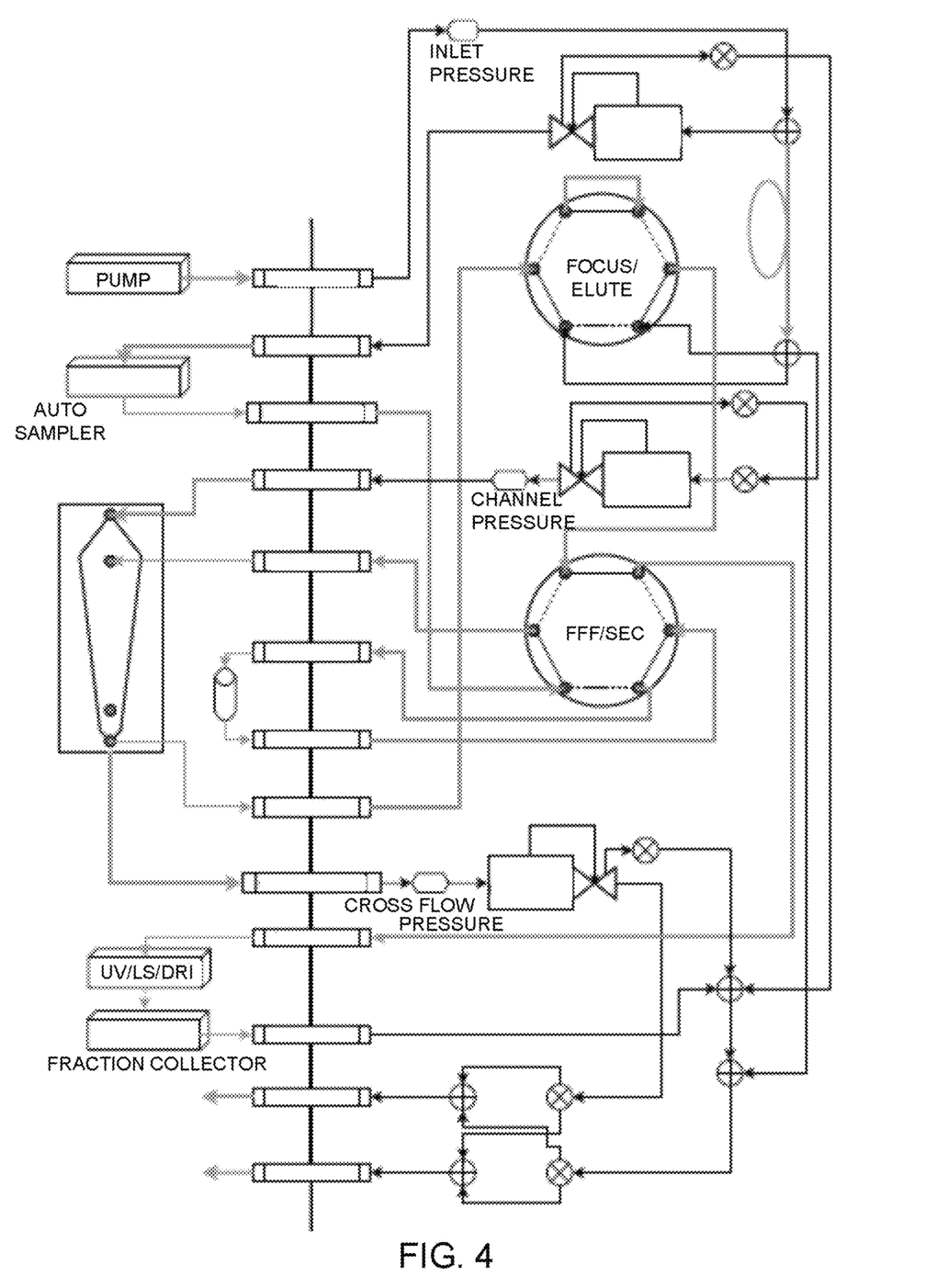
FIG. 4 depicts an apparatus in accordance with an exemplary embodiment.
Figure 5:
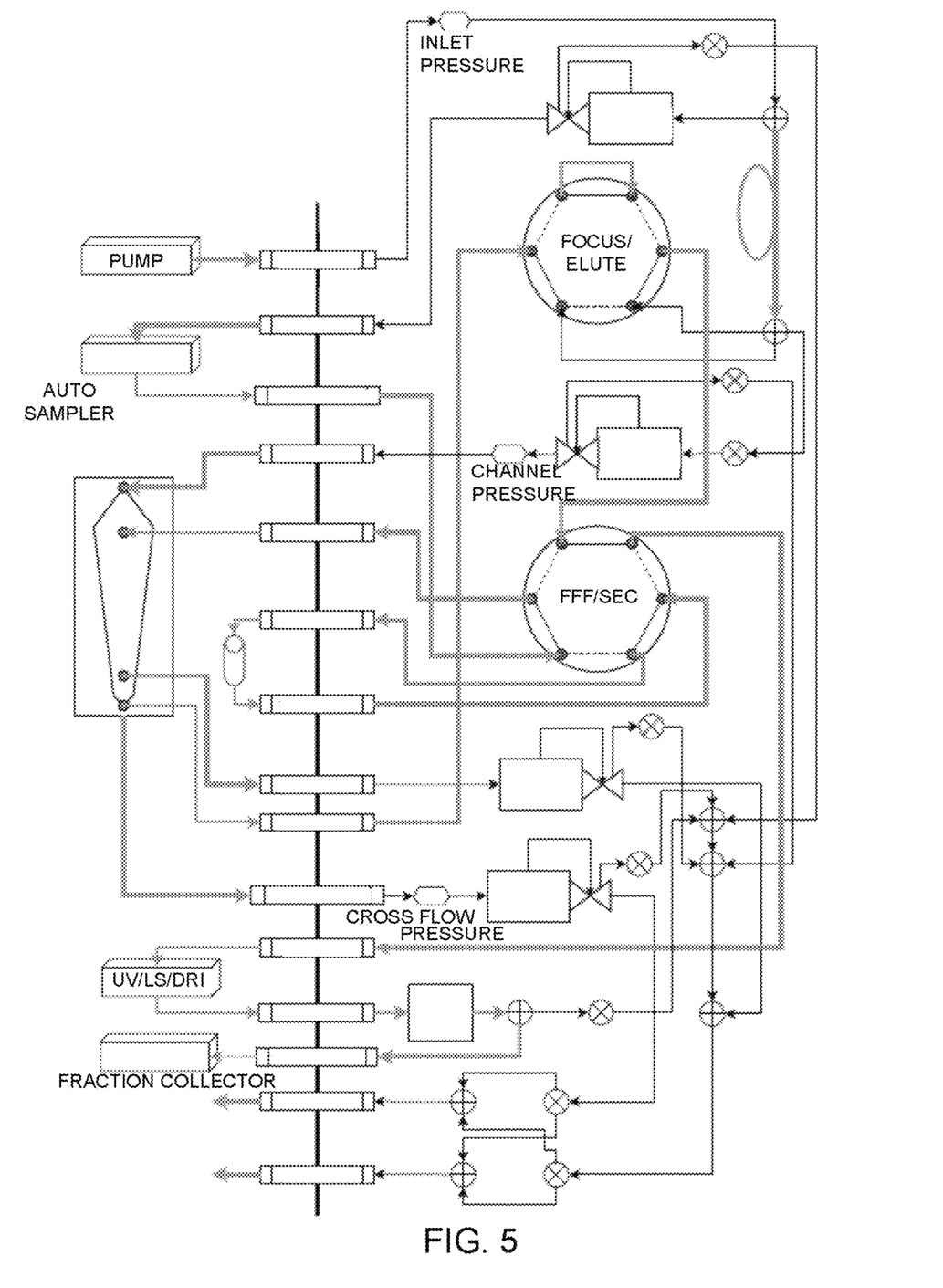
FIG. 5 depicts an apparatus in accordance with an exemplary embodiment.

In a further embodiment, as depicted in FIG. 3A and FIG. 3B, union assembly 110, 210 further includes a manifold 310 to house at least a subset of plurality of unions 112, 114, 212, 214, 216. Manifold 310 could increase the reliability of the apparatus, leading to fewer leak points in the apparatus and requiring less labor for installing/maintaining the apparatus.

The solvent management scheme depicted in FIG. 1 and FIG. 2 includes a combination of discrete components connected by tubing. However, many or all of these components can be combined into a manifold, as depicted in FIG. 3A and FIG. 3B. The manifold could help to reduce the space requirements of the system, and improves manufacturability by reducing the number of fluidic connections.

Recycle and Waste Assembly

In an embodiment, as depicted in FIG. 1 and FIG. 2, recycle and waste assembly 130, 230 includes (a) a first valve 132, 232 (V1) coupled to channel cross flow output 152, 252 of field flow fractionator 150, 250, (b) a second valve 134, 234 (V2) coupled to an output 116, 218 of union assembly 110, 210, (c) a first three port union 136, 236 (U1) coupled to first valve 132, 232 (V1) and to second valve 134, 234 (V2), where an output of first three port union 136, 236 is coupled to a recycle receptacle 170, 270, and (d) a second three port union 138, 238 (U2) coupled to first valve 132, 232 (V1) and to second valve 134, 234 (V2), where an output of second three port union 138, 238 is coupled to a waste receptacle 172, 272.

Purge Valves

In a further embodiment, as depicted in FIG. 1 and FIG. 2, the apparatus further includes a purge valve (PV) coupled to a proportional control valve coupled to field flow fractionator 150, 250, where purge valve is configured to remove air and to remove solvent from a line coupling purge valve to proportional control valve. In an embodiment, a proportional control valve 190, 290 (PV1) is coupled to an inject flow controller 101, 201 and an inject flow port 154, 254 of field flow fractionator 150, 250. In an embodiment, a proportional control valve 192, 292 (PV2) is coupled to an inlet flow controller 103, 203 and a channel inlet port 156, 256 of field flow fractionator 150, 250. In an embodiment, a proportional control valve 194, 294 (PV3) is coupled to a cross flow controller 105, 205 and a channel cross flow port 158, 258 of field flow fractionator 150, 250. In an embodiment, a proportional control valve 296 (PV4) is coupled to a pressure controller 207 and a dilution control module (DCM) port 259 of field flow fractionator 250.

Mass Flow Controller

In a further embodiment, the apparatus further includes a mass flow controller configured to be coupled to a sample injection port of flow fractionator 150, 250, where the mass flow controller is configured to control a rate of infusing a sample into a channel of flow fractionator 150, 250.

EXAMPLE

A simple example should suffice to explain the utility of intelligent solvent management. Consider a typical AF4 experiment to fractionate protein samples. The inlet flow is 4 ml/min, the detector flow is 1 ml/min and the cross flow is 3 ml/min. Further assume that each run takes 30 minutes. If all of the flows are sent to waste, then each run consumes 120 ml of solvent. However, most of these waste streams consist of clean, uncontaminated solvent. If a 5 kD molecular weight cutoff membrane is used in the FFF channel then the cross flow, which has been filtered by this membrane will be free of the sample protein and is safe to recycle. In this case, the 3 ml/min cross flow is sent back into the original solvent reservoir. Now a 30-minute run will only consume 30 ml, which is only 25% of the solvent required before. Since clean solvent can be expensive to prepare or dispose of, there is a clear benefit in being parsimonious.

Given that there are two outlets that can be routed separately to either waste or recycle, there are four possible recycle states, summarized in Table 1. During the hypothetical experiment described above, the Recycle states would be changed during the course of the experiment:
1. When setting up the hardware, the Recycle state is set to None to flush contaminants out of the system
2. Prior to and after the experiment, the Recycle state is set to Detector+Cross Flow to recover
3. During the experiment, the Recycle state is set to Cross Flow to recover most of the solvent, while routing the contaminated Detector output to waste Now consider another experiment that consists of fractionating proteins mixed with peptides that are small enough to pass through the channel membrane. In this case the cross flow will be contaminated with the peptides and should not be recycled into the source reservoir so one should revert to sending all exit flows to waste. The last example is a night rinse, where no sample is being used but the system is left with a slow flow through the channel to avoid stagnant fluid. In this case it is safe to recycle both flows and no solvent is consumed. The last state, while possible, is not commonly used. That is the case were the cross flow is sent to waste but the detector flow is recycled. If the cross flow that is filtered by the channel membrane is not considered clean enough to recycle, it is unlikely that the unfiltered detector flow can be recycled either.

TABLE 1

Recycle state Benefits and Downsides

| Recycle | Benefit | Downside |
|---|---|---|
| None | No risk of solvent contamination | Highest solvent consumption |
| Cross Flow | Low solvent consumption | Risk of contamination by low Mw species that passes through the membrane |
| Detector | None | If cross flow is not safe to recycle neither is detector flow |
| Detector + Cross Flow | Zero solvent consumption | Used for flushing only |

It is important to prevent the solvent reservoir from running dry. This can damage the pumps and filters in the system. With the ISM system, the instrument control software knows the magnitude of each flow and which port it is routed to. It computes the total amount of fluid that is lost to the waste port and how much is recycled. If the user enters into the software the initial volume of the source reservoir, it can keep a running tab of the remaining solvent. The user is given a couple of options. The first is a threshold solvent to decide whether to allow an experiment is allowed. The second option is to choose what should happen if the system runs low on solvent. It can either stop the flow, or switch the system to full recycle. Both of which prevent the solvent level from dropping further and insure that the solvent reservoir never runs dry.

Lastly, since each experiment has different recycle needs, the experiment method setup panel allows the user to choose between the various recycle modes described above. The options are: Recycle none, Recycle All, and Recycle XF (cross flow only). These correspond to the recycle states described above.

The software that tracks the solvent consumption can also track the total volume of fluid that has passed through the channel and the fraction that has passed through the fractionation membrane. This can be used to track aging of the system and signal the user when the membrane needs to be replaced. This software also counts the number of samples that have been injected into the channel and presents an injection counter to the user. This is shown FIG. 4. These features are useful for quality control applications where it is desirable to track the number of injections and the membrane usage to insure consistent performance. If they exceed preset maximums a warning is presented to the user.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:
   at least one detector;
   a field flow fractionator;
   a union assembly comprising a first input;
   a detector flow output path providing a detector flow output from the at least one detector to the first input of the union assembly, at least one union of the union assembly coupled to purge flow to the field flow fractionator; and a
   recycle and waste assembly having a first input receiving an output of the union assembly, a second input receiving a channel cross flow output of the field flow fractionator, a first output coupled to a recycle receptacle, and a second output coupled to a waste receptacle.

2. The apparatus of claim 1 wherein the union assembly further comprises at least one additional input coupled to at least one purge flow output coupled to the field flow fractionator.

3. The apparatus of claim 2 wherein the at least one union comprises a five port union coupled to three purge flow outputs coupled to the field flow fractionator and the detector flow output.

4. The apparatus of claim 2 wherein the at least one union comprises a plurality of unions coupled to three purge flow outputs coupled to the field flow fractionator and the detector flow output.

5. The apparatus of claim 4 wherein the union assembly further comprises a manifold to house at least a subset of the plurality of unions.

6. The apparatus of claim 2 wherein the at least one union comprises a four port union coupled to two purge flow outputs coupled to the field flow fractionator and the detector flow output; and
   a three port union coupled to a third purge flow output coupled to the field flow fractionator and an output port of the four port union.

7. The apparatus of claim 2 wherein the at least one union comprises a seven port union coupled to four purge flow outputs coupled to the field flow fractionator, a dilution control module waste flow output coupled to the field flow fractionator, and the detector flow output.

8. The apparatus of claim 2 wherein the at least one union comprises a first four port union coupled to two purge flow outputs coupled to the field flow fractionator and the detector flow output;
   a second four port union coupled to an output of the first four port union and two purge flow outputs coupled to the field flow fractionator; and
   a three port union coupled to an output port of the second four port union and a dilution control module waste flow output coupled to the field flow fractionator.

9. The apparatus of claim 2 wherein the at least one union comprises a plurality of unions coupled to four purge flow outputs coupled to the field flow fractionator, a dilution control module waste flow output coupled to the field flow fractionator, and the detector flow output.

10. The apparatus of claim 9 wherein the union assembly further comprises a manifold to house at least a subset of the plurality of unions.

11. The apparatus of claim 1 wherein the union assembly is coupled to the detector flow output.

12. The apparatus of claim 1 wherein the recycle and waste assembly comprises:
    a first valve coupled to the channel cross flow output of the field flow fractionator;
    a second valve coupled to an output of the union assembly;
    a first three port union coupled to the first valve and to the second valve, wherein an output of the first three port union is coupled to a recycle receptacle; and
    a second three port union coupled to the first valve and to the second valve, wherein an output of the second three port union is coupled to a waste receptacle.

13. The apparatus of claim 1 further comprising: a purge valve coupled to a control valve coupled to the field flow fractionator, wherein the purge valve is configured to remove air and to remove solvent from a line coupling the purge valve to the control valve.

14. The apparatus of claim 13 wherein the control valve is coupled to an inject flow controller and an inject flow port of the field flow fractionator.

15. The apparatus of claim 13 wherein the control valve is coupled to an inlet flow controller and a channel inlet port of the field flow fractionator.

16. The apparatus of claim 13 wherein the control valve is coupled to a cross flow controller and a channel cross flow port of the field flow fractionator.

17. The apparatus of claim 13 wherein the control valve is coupled to a pressure controller and a dilution control module port of the field flow fractionator.

18. The apparatus of claim 1 further comprising the field flow fractionator including a sample injection port, wherein a mass flow controller is coupled to a sample injection port of a field flow fractionator, wherein the mass flow controller is configured to control a rate of infusing a sample into a channel of the field flow fractionator.

19. An apparatus comprising:
    at least one detector;
    a field flow fractionator coupled to at least one detector;
    a union assembly comprising a first input;
    a detector flow output path providing a detector flow output from the at least one detector to the first input of the union assembly;

a recycle and waste assembly coupled to an output of the union assembly and further coupled to a channel cross flow output of the field flow fractionator, the recycle and waste assembly comprising a first output coupled to a recycle receptacle, and a second output coupled to a waste receptacle; and a channel cross flow path between the field flow fractionator and the second input of the recycle and waste assembly.

20. An apparatus comprising:
at least one detector;
a field flow fractionator coupled to the at least one detector;
a union assembly comprising a first input;
a detector flow output path providing a detector flow output from the at least one detector to the first input of the union assembly;
a recycle and waste assembly coupled to an output of the union assembly and further coupled to a channel cross flow output of the field flow fractionator, the recycle and waste assembly comprising a first output coupled to a recycle receptacle, and a second output coupled to a waste receptacle; and
an input path from an output of the union assembly to the first input of the recycle and waste assembly.

* * * * *